United States Patent
McAvey et al.

(10) Patent No.: US 8,695,645 B2
(45) Date of Patent: Apr. 15, 2014

(54) FUEL TRANSFER SYSTEM AND METHOD OF USING WITH OFF-ROAD OR SPORT/RECREATIONAL VEHICLES

(75) Inventors: Michael McAvey, Ridgewood, NJ (US); Walter Edlin, Monroe, NY (US)

(73) Assignee: McAvey Enterprises LLC, Ridgewood, NJ (US)

( * ) Notice: Subject to any disclaimer, the term of this patent is extended or adjusted under 35 U.S.C. 154(b) by 0 days.

(21) Appl. No.: 13/702,735

(22) PCT Filed: Jun. 7, 2011

(86) PCT No.: PCT/US2011/039385
§ 371 (c)(1),
(2), (4) Date: Apr. 1, 2013

(87) PCT Pub. No.: WO2011/156327
PCT Pub. Date: Dec. 15, 2011

(65) Prior Publication Data
US 2013/0199661 A1 Aug. 8, 2013

Related U.S. Application Data

(60) Provisional application No. 61/352,023, filed on Jun. 7, 2010.

(51) Int. Cl.
*B65B 3/00* (2006.01)

(52) U.S. Cl.
USPC ............... 141/1; 141/67; 141/231; 141/302; 137/351

(58) Field of Classification Search
USPC ............ 141/59, 67, 231, 301–302, 382–383, 141/387–389; 222/608, 318; 137/351
See application file for complete search history.

(56) References Cited

U.S. PATENT DOCUMENTS

| | | | | | |
|---|---|---|---|---|---|
| 4,064,901 | A | * | 12/1977 | Bailey | 137/351 |
| 6,056,028 | A | * | 5/2000 | Crawford | 141/382 |
| 6,167,903 | B1 | * | 1/2001 | Newman | 137/351 |
| 7,025,082 | B1 | * | 4/2006 | Wood | 137/351 |
| 7,793,801 | B2 | * | 9/2010 | Drummond | 222/179 |
| 2010/0101659 | A1 | * | 4/2010 | Trattner et al. | 137/87.03 |

* cited by examiner

*Primary Examiner* — Timothy L Maust
*Assistant Examiner* — Timothy P Kelly
(74) *Attorney, Agent, or Firm* — Brinks Gilson & Lione (57) ABSTRACT

A fuel transfer system and a method of using said system by an operator in transferring fuel from a fuel tank or fuel line of an off-road or sport/recreational vehicle to the fuel tank of a second vehicle, the fuel tank of auxiliary equipment or to some other reservoir is provided. The fuel transfer system generally comprises a fuel transfer fitting, a flexible conduit, and a nozzle.

23 Claims, 8 Drawing Sheets

*FIG - 1A*

PRIOR ART

*FIG - 1B*

PRIOR ART

*FIG - 1C*

PRIOR ART

FIG-7

FUEL TRANSFER SYSTEM AND METHOD OF USING WITH OFF-ROAD OR SPORT/RECREATIONAL VEHICLES

FIELD

This disclosure relates generally to a system and method for transferring fuel from a vehicle's fuel tank to a receiving reservoir. More particularly, this invention relates to a system and method for transferring a liquid fuel from the fuel tank of an off-road or sport/recreational vehicle to the fuel tank associated with a second vehicle or another type of motorized equipment.

BACKGROUND

Many off-road and sport/utility vehicles (including motorcycles) are designed with engines sized to be run at relatively fast speeds or under harsh environmental conditions. In addition, these vehicles are further designed to achieve a high level of maneuverability. One way to enhance the speed and maneuverability of these vehicles is to reduce their overall weight. One method usually used to reduce weight is to build the vehicles with relatively small fuel tanks, which inherently also limits their overall operating range.

During the operation of the off-road or sport/utility vehicle in a sparsely populated area, the vehicle user may at some time find himself with not have enough fuel to travel between fuel stations. In this situation, the user must tow the vehicle to the fuel station, carry extra fuel in an auxiliary tank or reservoir, or be able to bring a reservoir of fuel to the vehicle. However, the user usually finds each of these solutions inconvenient or dangerous in nature.

Various types of auxiliary tanks and reserve fuel tank systems for use with motorcycles and other motor vehicles are known. For example, U.S. Publication No. 2008/0011743 discloses an auxiliary fuel tank used with a motorcycle. The auxiliary fuel tank may be removed from the motorcycle and used to supply fuel to a second motorcycle.

U.S. Pat. No. 7,255,190 describes a portable fuel tank for use with a motorcycle, ATV, snowmobile or like vehicle. The portable fuel tank is coupled to the fuel tank and carburetor of the vehicle through the use of a switch cock valve.

U.S. Pat. Nos. 6,056,168 & 5,135,258 disclose a fuel tank located on a trailer that includes a dispensing nozzle in communication with a fuel pump used to dispense the fuel to a vehicle being carried on the trailer.

Finally, U.S. Pat. No. 4,311,261 discloses a combination fuel tank and carrying rack for a motorcycle having a rectangular tank, a fill pipe, and a gravity type fuel system. The top of the tank has vertical side legs and parallel rails to attach items for transporting. The tank further contains undercarriage arms and struts for attachment directly to the motorcycle through the use of fasteners.

Accordingly, there is a continual need or desire to provide an improved method or system to transfer fuel to an off-road or sport/utility vehicle that is found to be low on fuel when in a location distant from a fuel station.

SUMMARY

In satisfying the above need, as well as overcoming the enumerated drawbacks and other limitations of the related art, the present disclosure provides a fuel transfer system for use by an operator in transferring fuel from a fuel tank or fuel line of an off-road or sport/recreational vehicle (including motorcycles) to the fuel tank of a second vehicle, the fuel tank of auxiliary equipment, or to some other reservoir. The fuel transfer system generally comprises a fuel transfer fitting, a flexible conduit, and a nozzle.

The fuel transfer fitting is adapted to be coupled into the fuel line of the off-road or sport/recreational vehicle and to have a third connector point. The transfer fitting forms a channel through which fuel flows from the fuel tank to the fuel line when the vehicle's fuel pump or engine is running. The third connector point of the transfer fitting is used to couple to a connector present on the flexible conduit, thereby placing the conduit in communication with the channel in the transfer fitting. The conduit is also coupled to the nozzle. The nozzle allows the operator to control the transfer of fuel to the fuel tank of the second vehicle, the fuel tank of auxiliary equipment, or to another reservoir.

According to one aspect of the present disclosure, the fuel transfer fitting is coupled into the fuel line through the use of one selected from the group of quick disconnect fittings, threaded connections, or a combination thereof. The third connector point of the fuel transfer fitting may be a female component of such a quick disconnect fitting, while the connector of the flexible conduit may be a male component of a quick disconnect fitting.

According to another aspect of the present disclosure, the transfer fitting may further comprise an on-off valve. Such an on-off valve can be coupled to the third connector point through a threaded connector. A threaded connector may also be used as connector of the flexible conduit, which can be coupled to the third connector point through the on-off valve.

The transfer system may further comprise a flow or pressure regulator that controls the flow of fuel through the conduit and nozzle such that the vehicle's engine does not stall when the operator is transferring fuel to the second vehicle, auxiliary equipment, or another reservoir. When desirable the fuel transfer system may be electrically grounded.

Another objective of the present disclosure is to provide a method for an operator to transfer fuel from a fuel tank or fuel line of an off-road or sport/recreational vehicle to the fuel tank of a second vehicle, the fuel tank of auxiliary equipment, or to some other reservoir. This method generally comprises the steps of inserting a fuel transfer fitting into the fuel line between the engine and fuel tank; connecting a flexible conduit to the third connector point of the fuel transfer fitting; starting the engine of the off-road or sport/recreational vehicle or causing the fuel pump to operate via other means; allowing fuel to flow through the conduit without stalling the engine; and transferring fuel to the fuel tank of a second vehicle or auxiliary equipment or into another fuel reservoir.

The transfer fitting used in this method has a third connector point as described herein and forms a channel through which fuel can flow from the fuel tank to the fuel line. The conduit is in communication with the channel in the transfer fitting when the connector is coupled to the third connector point. The conduit has a nozzle that is adapted to allow the operator to control or adjust the transfer of fuel.

After the transfer of fuel is complete, the method may also include the removal of the fuel transfer system from the fuel line and the reconnection of the first and second components to form the conventional fitting (when present). Any fuel remaining in the fuel transfer system may be removed by using a pressure release tool to open the valve in one of the first and second connector points of the transfer fitting followed by pushing a button or lever that is associated with the nozzle assembly, thereby, allowing fuel to flow through the nozzle.

In order to allow the flow of fuel through the conduit, the method may further include a pressure regulator to control the flow of fuel in order to ensure that the engine does not stall. When desirable, the fuel transfer fitting, conduit, and nozzle may also be electrically grounded.

Further areas of applicability will become apparent from the description provided herein. It should be understood that the description and specific examples are intended for purposes of illustration only and are not intended to limit the scope of the present disclosure

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, a fuel transfer system made and used according to the teachings contained herein is described throughout the present disclosure in conjunction with a motorcycle for use either on a road or off-road in order to more fully illustrate the system and method of use. The incorporation and use of such a fuel transfer system in conjunction with other types of sport/recreational vehicles used either on a road or off-road, including but not limited to, all-terrain vehicles (ATVs), snowmobiles, personal watercraft, dune buggies, sandrails, dirt bikes, mopeds, motorized scooters, tractors, and golf carts, among others, is contemplated to be within the scope of the disclosure. It should be understood that throughout the description and drawings, corresponding reference numerals indicate like or corresponding parts and features.

The present invention generally provides a fuel transfer system for use with an off-road or on-road sport/recreational vehicle of the type having a fuel tank and a fuel sending unit, such as a fuel pump, for pumping fuel thorough a fuel line to the vehicle's engine when the engine is running. The fuel transfer system allows fuel in the fuel tank or fuel line of the vehicle to be delivered to an auxiliary fuel vessel, such as the fuel tank of another vehicle, a fuel container, or an engine powered machine. When the engine of the vehicle is running (e.g., idling, etc.) or the fuel pump is running due to any other means, the control of fuel is partially diverted from the fuel line to the fuel transfer system in such a manner that will not cause the engine to starve, stall, or stop running. Preferably, the engine of the off-road or sport/recreational vehicle utilizes fuel injection technology.

Figures 1A, 1B, 1C:
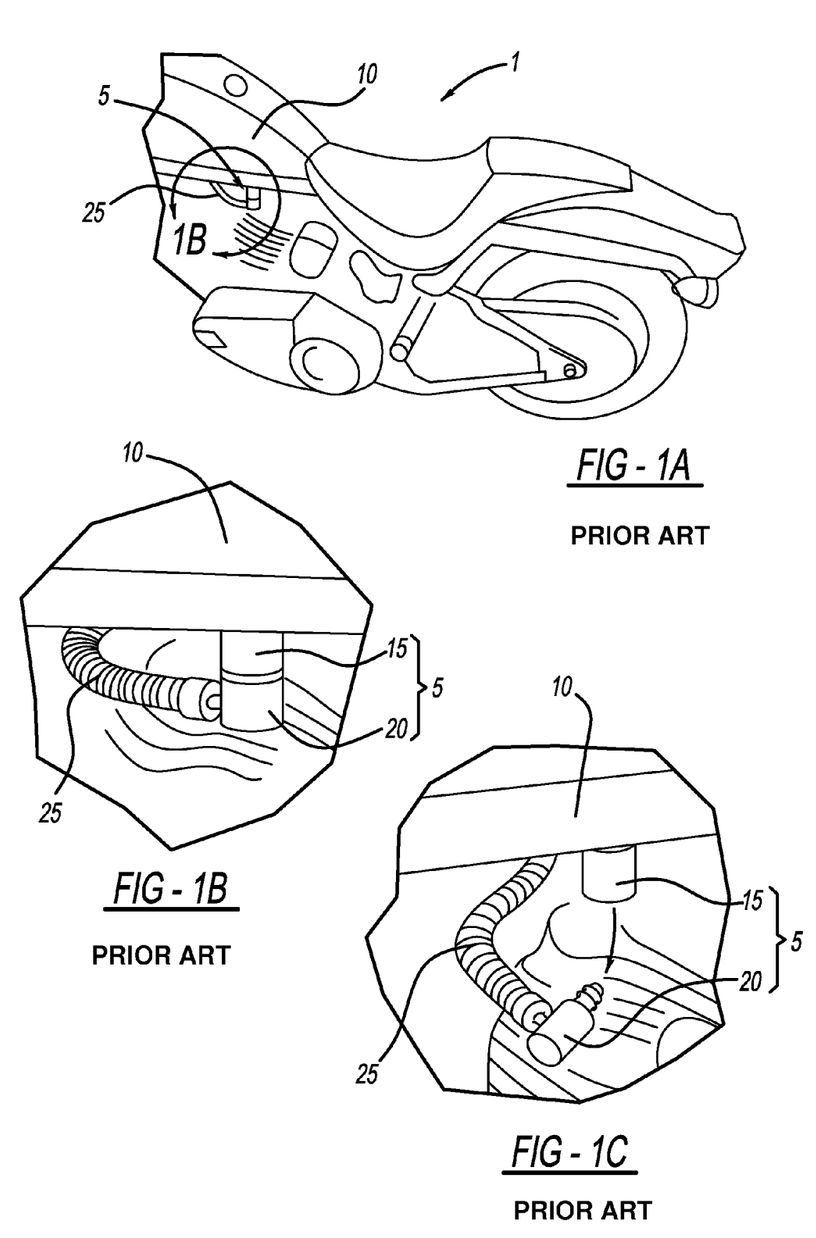
FIG. 1A is perspective view of a motorcycle highlighting a conventional fuel fitting coupled to the motorcycle's fuel tank and a fuel line.
FIG. 1B is a perspective view of the conventional fuel fitting from FIG. 1A.
FIG. 1C is another perspective view of the conventional fuel fitting from FIG. 1A highlighting the use of a quick disconnect coupling.

Referring to FIGS. 1A and 1B, a motorcycle 1 is shown in which a conventional fuel connector 5 couples the motorcycle's fuel tank 10 to a fuel line 25 in order to supply fuel to the motorcycle's engine. The conventional fuel connector 5 typically includes a quick disconnect fitting that comprises both a female component 15 (e.g., first component) and a male component 20 (e.g., second component) that couple together to provide a leak-free connection. The female component 15 and male component 20, when connected define a channel that connects the motorcycle's fuel tank 10 to a fuel line 25 that feeds the engine. One skilled-in-the-art will understand that a motorcycle may be manufactured with a conventional fuel connector 5 as standard equipment or a conventional fuel connector 5 can be inserted between the fuel tank and the fuel line as an aftermarket retrofit.

Referring now to FIG. 1C, when the female component 15 and the male component 20 are disconnected from one another, the female component 15 and the male component 20 remain coupled to the fuel tank 10 and the fuel line 25, respectively. The female connector 15 and male connector 20 are typically designed such that the flow of fluid through the connector is stopped or halted when the connectors are not coupled together. The ability to separate the fuel line 25 and male connector 20 from the fuel tank 10 and the female connector 15 allows for the quick, in-field installation and use of the fuel transfer system of the present disclosure. One skilled in the art will understand that although the location of the male and female components with respect to the fuel tank and the fuel line can be reversed without exceeding the scope of this disclosure.

Figure 2:
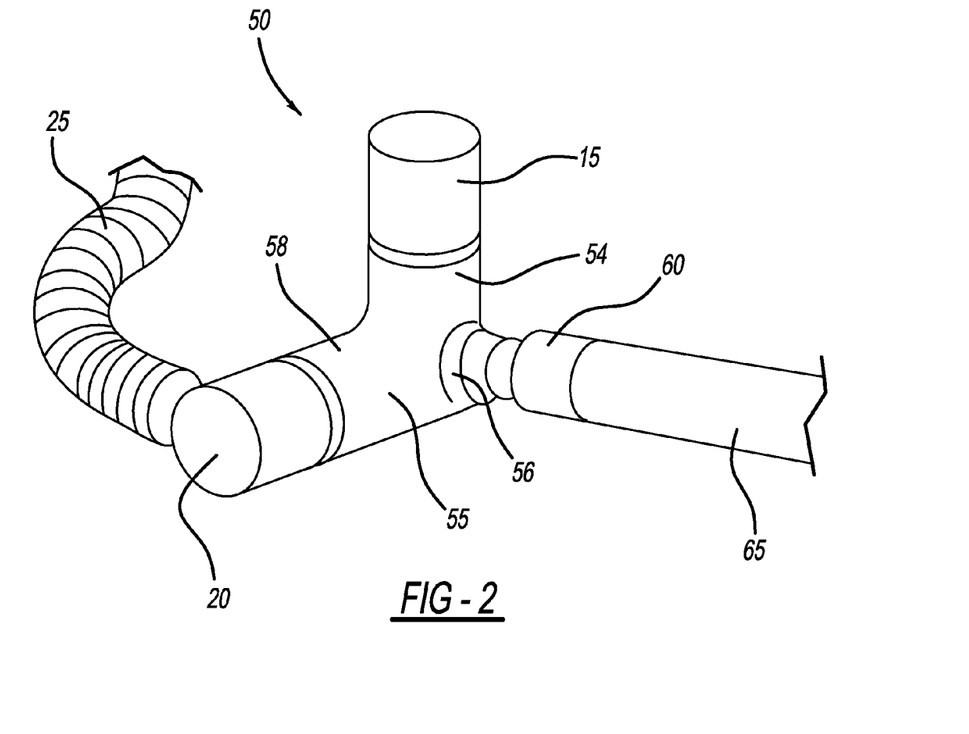
FIG. 2 is a perspective view of a fuel transfer fitting constructed according to the teachings of the present disclosure.
Figure 3A:
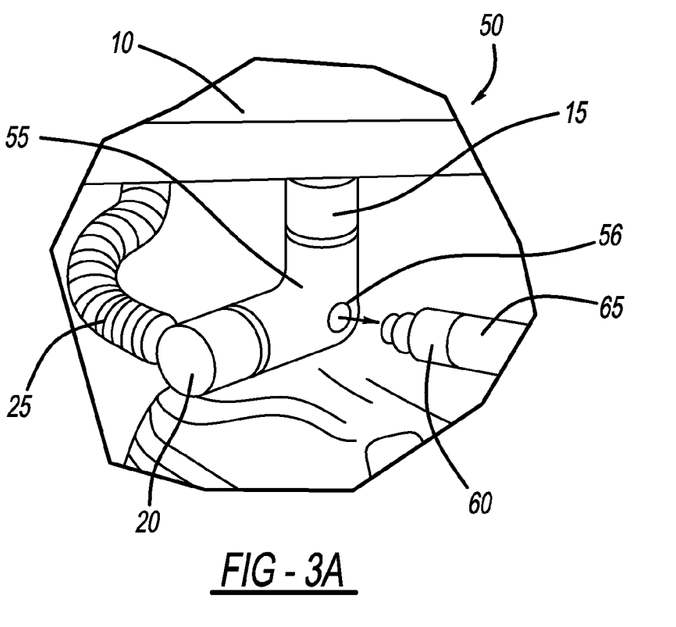
FIG. 3A is a perspective view of the fuel fitting of FIG. 2 highlighting the use of a quick disconnect coupling to a conduit used in the fuel transfer system according to one aspect of the present disclosure.

Referring now to FIGS. 2, and 3A, a fuel transfer system 50 is shown to include a fuel transfer fitting 55 made according to one aspect of the present disclosure. The fuel transfer system 50 is an easy to install system that allows the end-user to transfer liquid fuel (e.g., gasoline, E85, E95, diesel fuel, or other fuel) directly from the host off-road or sport/recreational vehicle's fuel tank 10 to the fuel tank (not shown) of a second vehicle or auxiliary equipment, as well as to a portable fuel container if desired. In this system 50, a fuel transfer fitting 55 may be inserted into the fuel line 25 using a connector or coupling that is compatible with the existing fuel line 25.

The fuel transfer fitting 55 is designed such that one end (first connector point) 54 connects to the female component 15 of the conventional fuel fitting 5, while the other end (second connector point) 58 of the transfer fitting 55 couples to the male component 20 of the conventional fitting 5. The fuel transfer fitting 55 may be any desired shape, including L-shaped (shown in FIGS. 2 and 3A), Y-shaped, T-shaped, or shaped in a straight line, to name a few. The fuel transfer fitting 55 includes a third connector point 56, which may include another female component for use in a quick disconnect fitting arrangement. The third connector point 56 (e.g., female component) may be coupled to a male connector 60 located at the end of a conduit 65 used as part of the fuel transfer system 50. The fuel transfer fitting 55 is designed such that a channel is formed through which fuel can flow when the vehicle's fuel pump is running. Thus the fuel transfer fitting 55 is capable of interacting with the conventional fuel fitting 5 in such a way as to open a passageway through which fuel can flow when necessary or desired for use in the fuel transfer system 50.

Still referring to FIGS. 2 and 3A, the connection between the third connector point 56 (e.g., female component) and the male connector 60 may be accomplished by any means known to one skilled-in-the-art of quick disconnect fittings, including but not limited to double poppet valves or a stem valve and sleeve arrangement, to name a few. In addition, one end of the male connector 60 is coupled to the conduit 65 through the use of any means of connection known to one skilled-in-the-art, including but not limited to a threaded connector, among others.

Figure 3B:
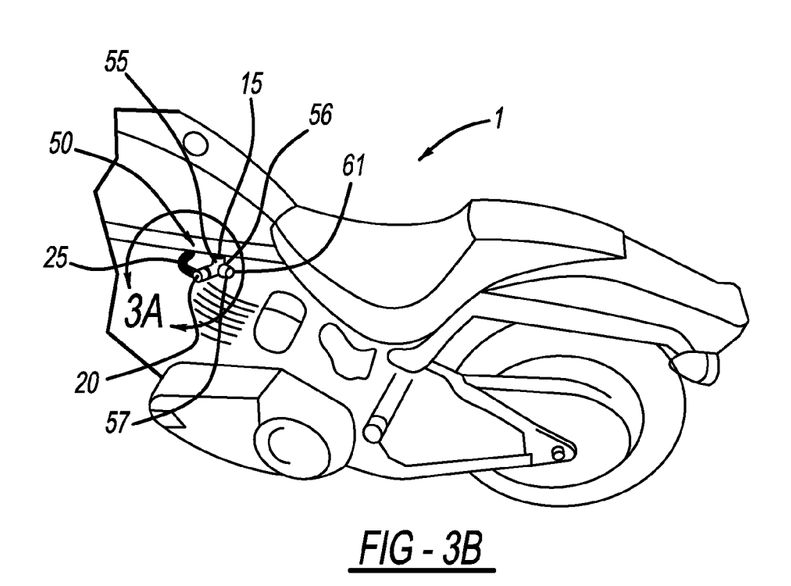
FIG. 3B is a perspective view of a motorcycle highlighting the use of the fuel fitting of FIG. 3A.

Referring now to FIG. 3B, according to another aspect of the present disclosure, one skilled-in-the-art will understand that the third connector point 56 of the fuel transfer fitting 55 may also include a threaded connector to which an on-off valve 57, such as a ball valve, a check valve, a butterfly valve, or a gate valve, among others, may be coupled. The on-off valve 57 may further comprise a connector 61 that is adapted to mate with the connector 60 of the conduit 65. Such a connector 61 may be a female component of a quick disconnect fitting, a threaded connector, or the like.

Figures 4A, 4B, 4C:
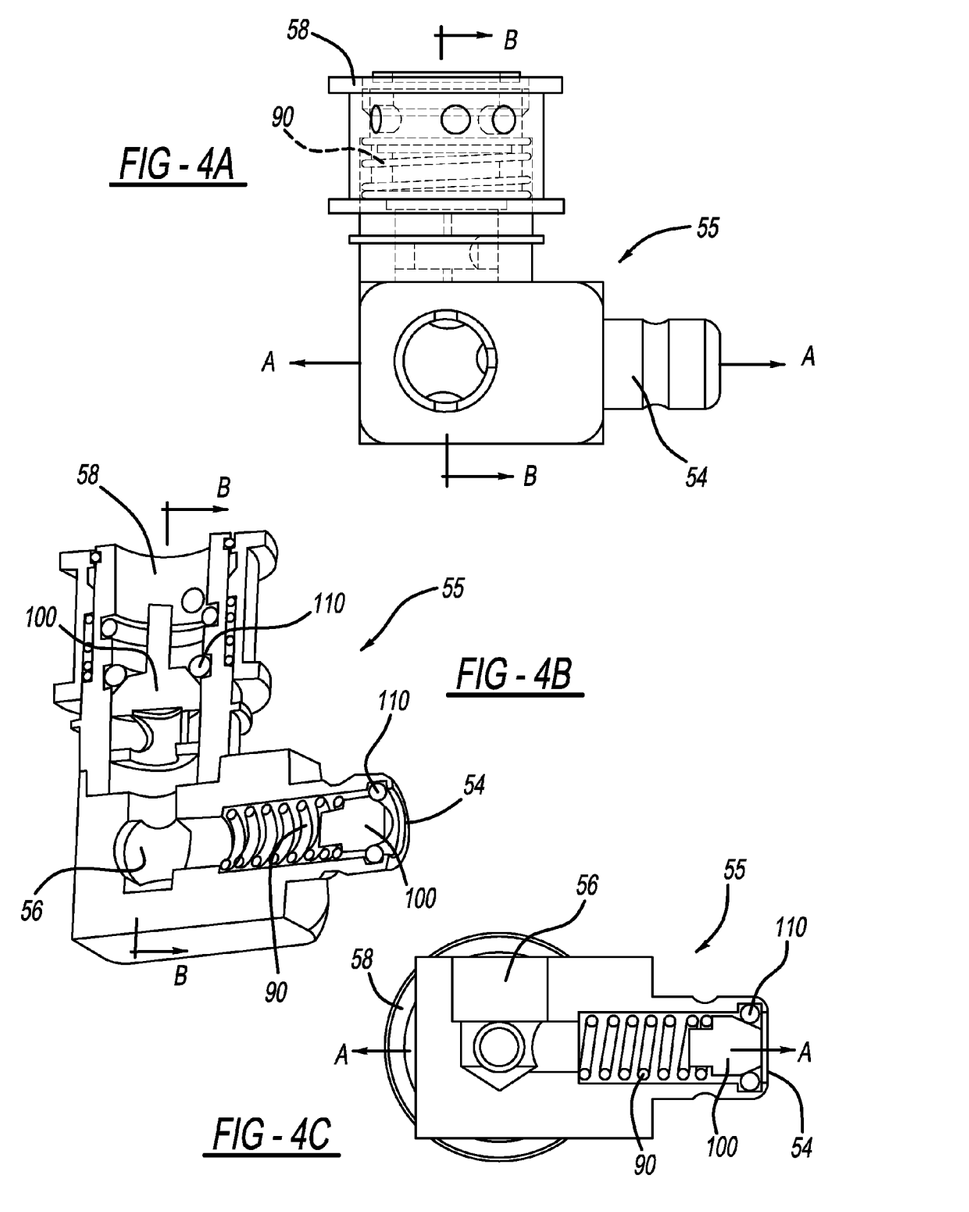
FIG. 4A is another perspective view of a fuel transfer fitting constructed according to the teachings of the present disclosure.
FIG. 4B s a cross-sectional view of the fuel transfer fitting of FIG. 4A taken along axis B-B.
FIG. 4C is a cross-sectional view of the fuel transfer fitting of FIG. 4A taken along axis A-A.

Referring now to FIGS. 4A, 4B, and 4C, the transfer fitting 55 according to one aspect of the present disclosure is shown in which the first connector point 54 is a male quick disconnect fitting, the second connector point 58 is a female quick disconnect fitting, and the third connector point 56 is a female quick disconnect fitting. A female and male quick disconnect fitting are designed to mate with one another to form a quick disconnect coupling. Each of the fittings contains a valve which is held open when the fittings are coupled together, thereby, allowing fuel to flow through the coupling. When the fittings are disconnected, a spring 90 in the fitting closes the valve by allowing a stem 100 to seal against an annular seat 110, thereby, stopping the flow of fuel through the fitting. One skilled in the art will understand that although each of the connector points 54, 56, 58 is illustrated in the Figures as being a quick disconnect fitting, other types of fittings may be used without exceeding the scope of the present disclosure.

Figure 5A:
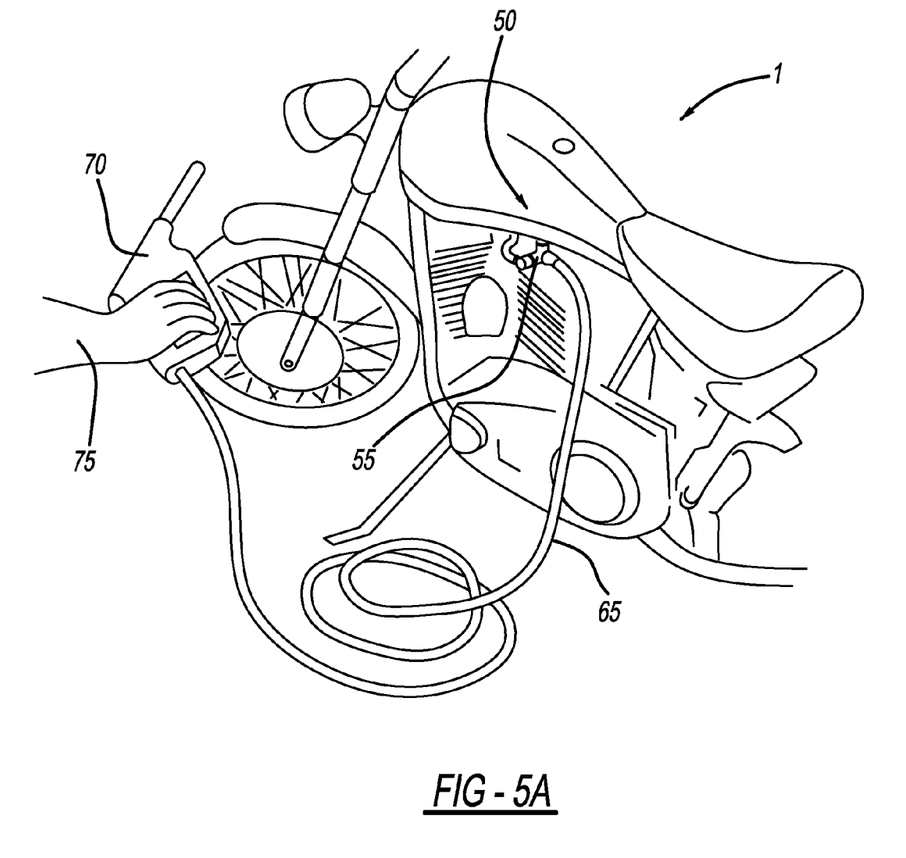
FIG. 5A is a perspective view of a motorcycle using the fuel fitting of FIG. 3A as part of a fuel transfer system according to another aspect of the present disclosure.

Referring now to FIG. 5A, the fuel transfer system 50 according to one aspect of the present disclosure includes a fueling nozzle 70, a fuel transfer fitting 55, and a flexible fuel conduit 65 that may when desired be optionally partially electrically connected and grounded to the vehicle. This can be accomplished according to one aspect of the present disclosure by having all of the components made out of a conductive material, such as a metal. The flexible, second fuel conduit 65 may be inherently conductive when it is selected as one from the group of a conductive material (e.g., metal or conductive polymer, among others), a non-conductive material reinforced with conductive fillers, or a non-conductive material having a separate conductive element running the length of the conduit 65. The separate conductive element may be a conductive mesh of fibers or wires embedded within second fuel conduit 65. The flexible fuel conduit 65 may be comprised of multiple layers of different materials with the conductive element being located at the interface between two adjacent layers if desirable. One skilled-in-the-art will understand that the conductive element may also include a separate wire running the length of the second fuel conduit 65 and coupled thereto by any means known, including but not limited to clamps (e.g., band clamps, etc.) and clips (e.g. alligator clips, etc.).

Optionally, a grounding cable or connector (not shown), such as an alligator type clip, may be attached to the fueling nozzle 70 and capable of engaging another grounded element, such as the off-road or sport/utility vehicle, or the second vehicle, auxiliary equipment, or portable fuel container, thereby, assisting in making the entire fuel transfer system 50 electrically common or grounded. The use of a grounding cable or connector becomes more important if an operator 75 uses a conventional hose (e.g., garden hose, etc.) to connect the nozzle 70 to the fuel transfer fitting 55. According to one aspect of the present disclosure the fuel transfer system is optionally partially electrically grounded.

The fuel transfer system 50 according to another aspect of the present disclosure may also include a flow/pressure regulator (not shown) or any other means known to one skilled-in-the-art to assist in ensuring that the transfer of fuel from the fuel line 25 through the conduit 65 does not starve or stall the engine during use. The use of such a regulator may be desirable when the fuel transfer system 50 is used with an off-road or sport/recreational vehicle that does not utilize fuel injection technology.

Figure 5B:
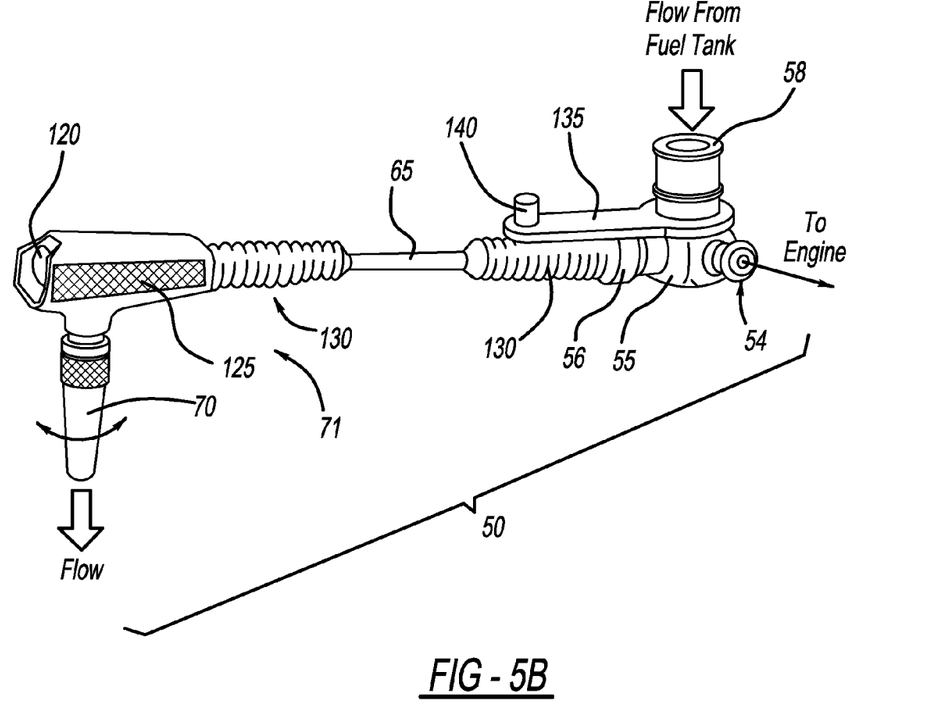
FIG. 5B is another perspective view of a fuel transfer system according to another aspect of the present disclosure.

Referring now to FIG. 5B, the fuel transfer system 50 according to one aspect of the present disclosure comprises a transfer fitting 55 having a first connector point 54, a second connector point 58, and a third connector point 56. The third connector point 56 is coupled to one end of a flexible conduit 65. The other end of the flexible conduit 65 is coupled to a nozzle assembly 71 that includes a nozzle 70 and a push button or lever 120 incorporated into a jacket or case 125. Optionally, each end o the conduit 65 may also comprise strain relief jackets 130 encompassing the connections between the conduit 65 and the nozzle assembly 71 or third connector point 56.

Still referring to FIG. 5B, the fuel transfer system 50 may also include a pressure release tool 135 that is sized and adapted to be inserted into one of the first or second connector points 54, 58 after the fuel transfer system 50 has been used to transfer fuel from the fuel tank of a motorcycle to a second vehicle or other reservoir. The pressure release tool 135 is preferably bendable and includes a tip 140 that can be used to open the valve in at least one of the first or second connectors 54, 58, thereby, reducing the pressure in the fuel transfer system 50. When the pressure release tool 135 engages the first or second connector point 54, 56 in the fitting 55, the fuel in the conduit 65 and fitting 55 can be drained through the nozzle 70.

Figures 6A, 6B:
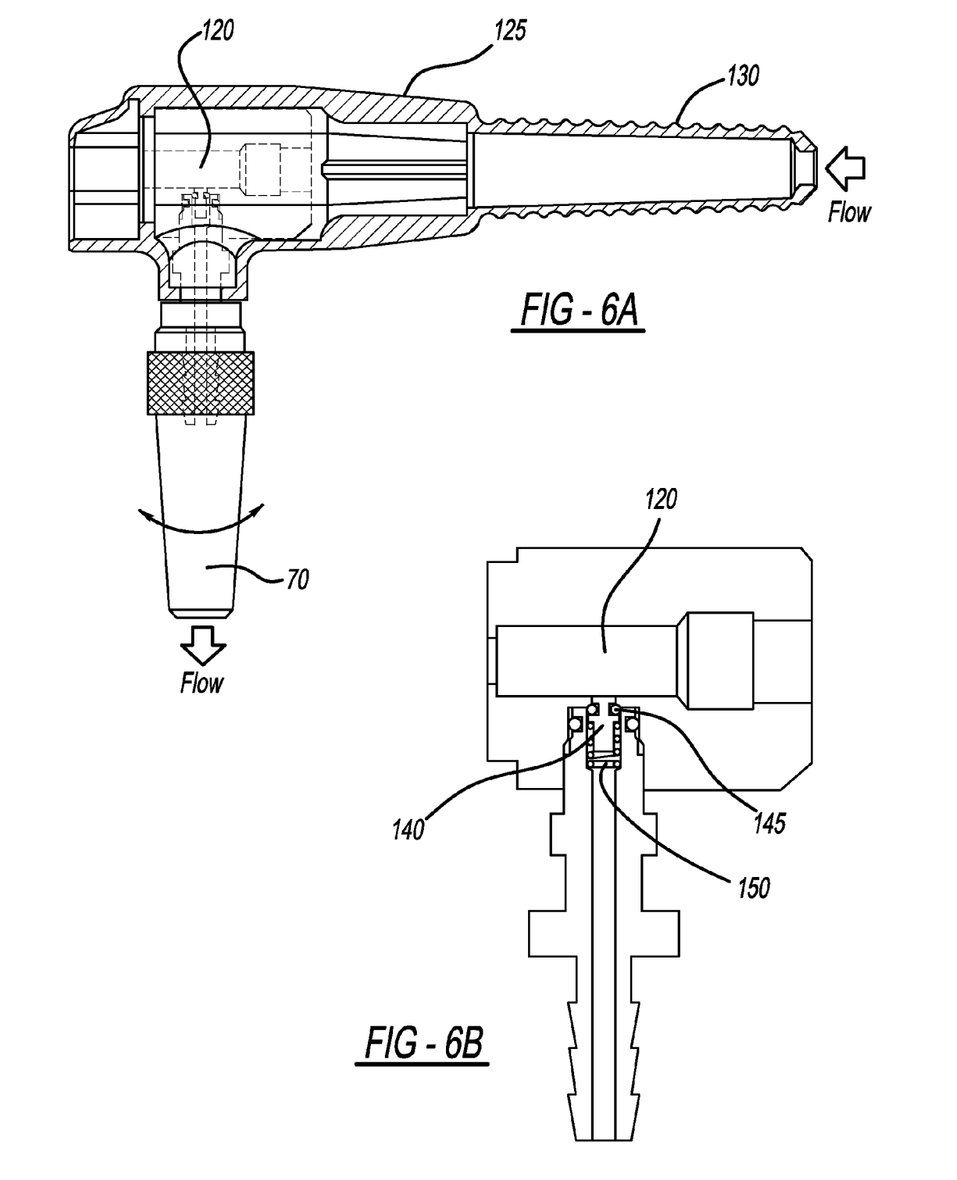
FIG. 6A is a cross-sectional view of the nozzle assembly of the fuel transfer system according to another aspect of the present disclosure.
FIG. 6B is a cross-sectional view of the nozzle in the nozzle assembly of FIG. 6A.

Referring now to FIGS. 5B, 6A and 6B, the nozzle assembly 71 includes a nozzle 70 that is adjustable in order to increase or decrease the flow of fuel through the nozzle 70. Turning the nozzle 70 fully in one direction will open the nozzle 70 completely, while turning the nozzle 70 fully in the other direction will cause the nozzle 70 to stop the flow of fuel. The nozzle 70 includes a valve having a stem 140, a seat 145, and a spring 150. The valve of the nozzle 70 is in communication with the push button or lever 120. Pushing the button or lever 120 causes the valve in the nozzle 70 to open, thereby, allowing fuel to flow through the nozzle 70. Turning the nozzle 70 fully to its closed position can prevent the push button or lever 120 from opening the valve in the nozzle 70.

Figure 7:
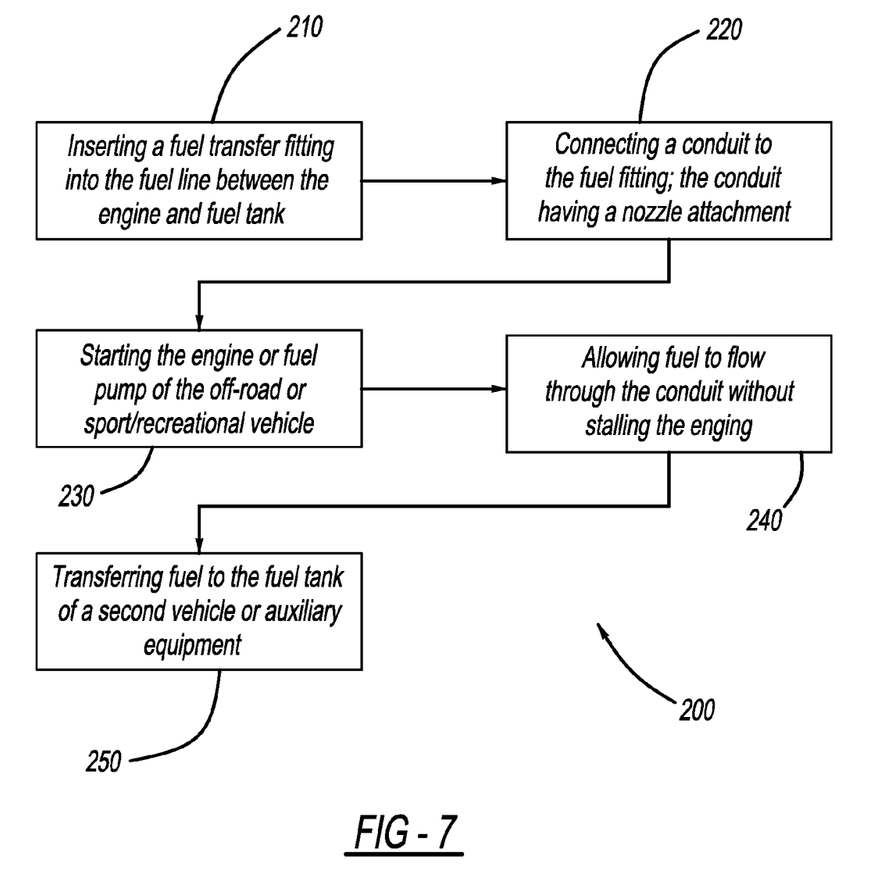
FIG. 7 is a schematic representation of a method of transferring fuel from an off-road or recreational/sport vehicle to a second vehicle, reservoir, or motorized equipment according to one embodiment of the present disclosure.

Referring to FIG. 7, a method 200 for transferring fuel from the fuel tank of an off-road or sport/recreational vehicle to the fuel tank of a second vehicle, the fuel tank of auxiliary equipment, or to another fuel reservoir is provided. The use of this method will allow, for example, the transfer of fuel from the off-road or sport/recreational vehicle to a second vehicle or auxiliary equipment that has run short of fuel or it can be used to simply empty the fuel tank of the off-road or sport/recreational vehicle in preparation of the vehicle being stored or transported. Such a method 200 generally comprises multiple steps, the first of which is inserting 210 a fuel transfer fitting 55 as previously described into the fuel line between the engine and fuel tank of the off-road or sport/recreational vehicle. Such a fuel transfer fitting 55 may be inserted into the fuel line when the engine is turned off and the fuel line includes a conventional quick disconnect fitting 5. The fuel transfer fitting 55 may also be inserted into the fuel line when the fuel tank and fuel line are empty either during the manufacture of the vehicle or as an aftermarket retrofit.

The next step in the method 200 is connecting 220 a conduit to the fuel transfer fitting 55. The other end of the conduit has a nozzle attachment 70 through which the fuel will be dispensed into the fuel tank of the second vehicle or auxiliary equipment. Fuel is then allowed to flow through the fuel line by starting 230 the engine of the off-road or sport/recreational vehicle. Allowing 240 fuel to flow through the conduit 65 without stalling the engine is important to facilitate the transfer of the fuel. The final step is actually transferring 250 the fuel to the fuel tank of a second vehicle or auxiliary equipment.

Optionally, the method may further include separating a conventional fitting 5 into a first component 15 and a second component 20 in order to insert the fuel transfer fitting 55 into the fuel line 25. In this case, the first connector point 54 of the transfer fitting 55 can be coupled to the first component 15 and the second connector point 58 of the transfer fitting 55 can be coupled to the second component 20 in order to create a channel through which the fuel can flow. The nozzle 70 can be opened and adjusted to control the flow of fuel through the fuel transfer system 50. The operator 75 can begin transferring fuel through the fuel transfer system 50 by using the push button or lever 120 to open the valve in the nozzle 70.

After the transfer of fuel is complete, the method may also include the removal of the fuel transfer system 60 from the fuel line 25 and the reconnection of the first and second components 15, 20 to form the conventional fitting 5 (when present). Any fuel remaining in the fuel transfer system 50 can be removed by using the pressure release tool 135 to open the valve in one of the first and second connector points 54, 58 of the transfer fitting 55, followed by pushing the button or lever 120 to allow fuel to flow through the nozzle 70.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fuel transfer system for use by an operator in transferring fuel from a vehicle to container or other reservoir, wherein the vehicle is of the type having a fuel tank with an internal fuel pump and a fuel line from the fuel tank to an engine of the vehicle, wherein the fuel line or the fuel tank includes a vehicle fitting having a first component and a second component releasably connectable to the first component, the first component and the second component forming a first channel when connected through which the fuel can flow; and in which the first component and the second component stop the flow of the fuel when the first component and the second component are separated; the fuel transfer system comprising:

a fuel transfer fitting having a first connector point, a second connector point, and a third connector point; the fuel transfer fitting adapted to be coupled to the vehicle fitting first and second components, the fuel transfer fitting forming a second channel through which the fuel can flow from the fuel tank through the fuel line and the fuel transfer fitting when the fuel pump is running, the first connector point and the second connector point each including a normally closed valve sealing the first connector point and the second connector point when the fuel transfer fitting is separated from the vehicle fitting, and opening for fuel flow through the second channel when the fuel transfer fitting is coupled to the vehicle fitting;

a flexible conduit having a conduit connector coupled to the third connector point of the fuel transfer fitting; the flexible conduit being in communication with the second channel in the fuel transfer fitting; and a nozzle coupled to the flexible conduit; the nozzle allowing the operator to control the transfer of the fuel to the container, or other reservoir.

2. The fuel transfer system of claim 1, wherein the fuel transfer fitting first connector and the second connector point having a quick disconnect fitting, a threaded connection, or a combination thereof.

3. The fuel transfer system of claim 1, wherein the first connector point and the second connector-point include quick disconnect fittings for coupling with the vehicle fitting first and second component.

4. The fuel transfer system of claim 1, wherein the third connector point is a female component of a quick disconnect fitting.

5. The fuel transfer system of claim 1, wherein the nozzle further comprises a valve being coupled to the third connector point to control fuel flow through the flexible conduit, the third connector point being releasably coupled to the conduit connector.

6. The fuel transfer system of claim 4, wherein the conduit connector is a male component of a quick disconnect fitting.

7. The fuel transfer system of claim 5, wherein the conduit connector is a threaded connector and is coupled to the third connector point through the valve.

8. The fuel transfer system of claim 1, wherein the transfer system further comprises a flow regulator that controls the flow of the fuel through the conduit and the nozzle such that when the vehicle engine is running and the fuel pump to supplying fuel to the engine the engine does not stall when the operator is transferring fuel to the container, or other reservoir, the flow regulator having at least three settings for adjusting a maximum flow of the fuel, including a fully open setting, a fully closed setting, and an intermediate setting between the fully open setting and the fully closed setting allowing an intermediate flow of the fuel that is less than the maximum flow of the fuel at the fully open setting.

9. The fuel transfer system of claim 8, wherein the flow regulator is located proximate to the nozzle.

10. The fuel transfer system of claim 8, wherein the flow regulator is adjustable; the flow regulator being capable of increasing or decreasing the maximum flow of the fuel.

11. The fuel transfer system of claim 8, wherein the nozzle further comprises a button or handle in communication with a valve such that depressing the button or handle opens the valve in order to allow the transfer of the fuel, and wherein the valve forms the flow regulator.

12. The fuel transfer system of claim 1, wherein the system is configured to be electrically grounded.

13. The fuel transfer system of claim 1, wherein the fuel pump is configured to be operated when the engine is running.

14. The fuel transfer system of claim 12, wherein the system is grounded through the vehicle.

15. A fuel transfer system for use by an operator in transferring fuel from a vehicle to a container or a reservoir, the vehicle having a vehicle fitting and fuel pump, the fuel transfer system comprising,
   a fuel transfer fitting having a first connector point, a second connector point, and a third connector point; the fuel transfer fitting adapted to be coupled into the vehicle fitting; the transfer fitting forming a channel through which fuel flows from the fuel tank through the fuel line and the fuel transfer fitting when the fuel pump is running;
   a flexible conduit having a connector that can couple to the third connector point of the fuel transfer fitting; the flexible conduit being in communication with the channel in the fuel transfer fitting when the connector is coupled to the third connector point; and
   a nozzle coupled to the conduit; the nozzle allowing the operator to control the transfer of the fuel to the container or other reservoir and
   a pressure release tool; the pressure release tool including a tip sized to be inserted into one of the first connector point and the second connector point, to open a normally closed valve in at least one of the first connector point and the second connector point such that the valve is open to allow air to enter the flexible conduit.

16. A method for an operator to transfer fuel from a vehicle to a container or other reservoir, wherein the vehicle has a fuel tank with an internal fuel pump and a fuel line from the fuel tank to an engine of the vehicle, wherein the fuel line includes a vehicle fitting having a first component and a second component releasably connectable to the first component, wherein further the first component and the second component forming a first channel when connected, through which fuel can flow; the method comprising the steps of:
   inserting a fuel transfer fitting having a first connector point, a second connector point, and a third connector point between the first component and the second component; the first connector-point and second connector point of the fuel transfer fitting forming a second channel through which the fuel can flow from the fuel tank through the fuel line and the fuel transfer fitting, the first connector point and the second connector point each including a normally closed valve sealing the first connector point and second connector point when the fuel transfer fitting is decoupled from the vehicle fitting and opening the first and the second connectors for fuel flow when the fuel transfer fitting is coupled to the vehicle fitting;
   providing a flexible conduit connected to the third connector point of the fuel transfer fitting; the flexible conduit being in communication with the second channel in the fuel transfer fitting when the flexible conduit is coupled to the third connector point; the conduit having a nozzle; the nozzle adapted to allow the operator to control the transfer of fuel to the container or reservoir;
   starting the engine or the fuel pump of the vehicle;
   allowing fuel to flow through the flexible conduit; and
   transferring fuel to the container or other reservoir.

17. The method of claim 16, wherein the step of allowing the fuel to flow through the flexible conduit uses a flow regulator for controlling the flow of fuel through the flexible conduit.

18. The method of claim 16, wherein the method further comprising the step of ensuring that the fuel transfer fitting, conduit, and nozzle are electrically grounded.

19. The method of claim 18, wherein the fitting, conduit, and nozzle are electrically grounded.

20. The method of claim 16, wherein the method further comprises the steps of;
   releasably coupling the first component to the first connector point of the fuel transfer fitting; and
   releasably coupling the second component to the second connector point of the fuel transfer fitting.

21. The method of claim 16, wherein the method further comprises the step of adjusting the flow of fuel through the nozzle.

22. The method of claim 16, wherein the method further comprises the step of pushing a button or lever proximate to the nozzle in order to open a valve that allows fuel to flow through the nozzle in order to be transferred to the container or another reservoir.

23. The method of claim 22, wherein the method further comprises the steps of disconnecting the fuel transfer fitting from the vehicle fitting;
   inserting a pressure release tool into at least one of the first connector point or the second connector point in order to release pressure; and
   pushing the button or lever to drain any fuel present in the nozzle, flexible conduit, and fuel transfer fitting.

* * * * *